Dec. 14, 1937.  W. A. HART  2,102,071
GEAR BROACHING MACHINE AND METHOD
Filed April 29, 1935    2 Sheets-Sheet 1
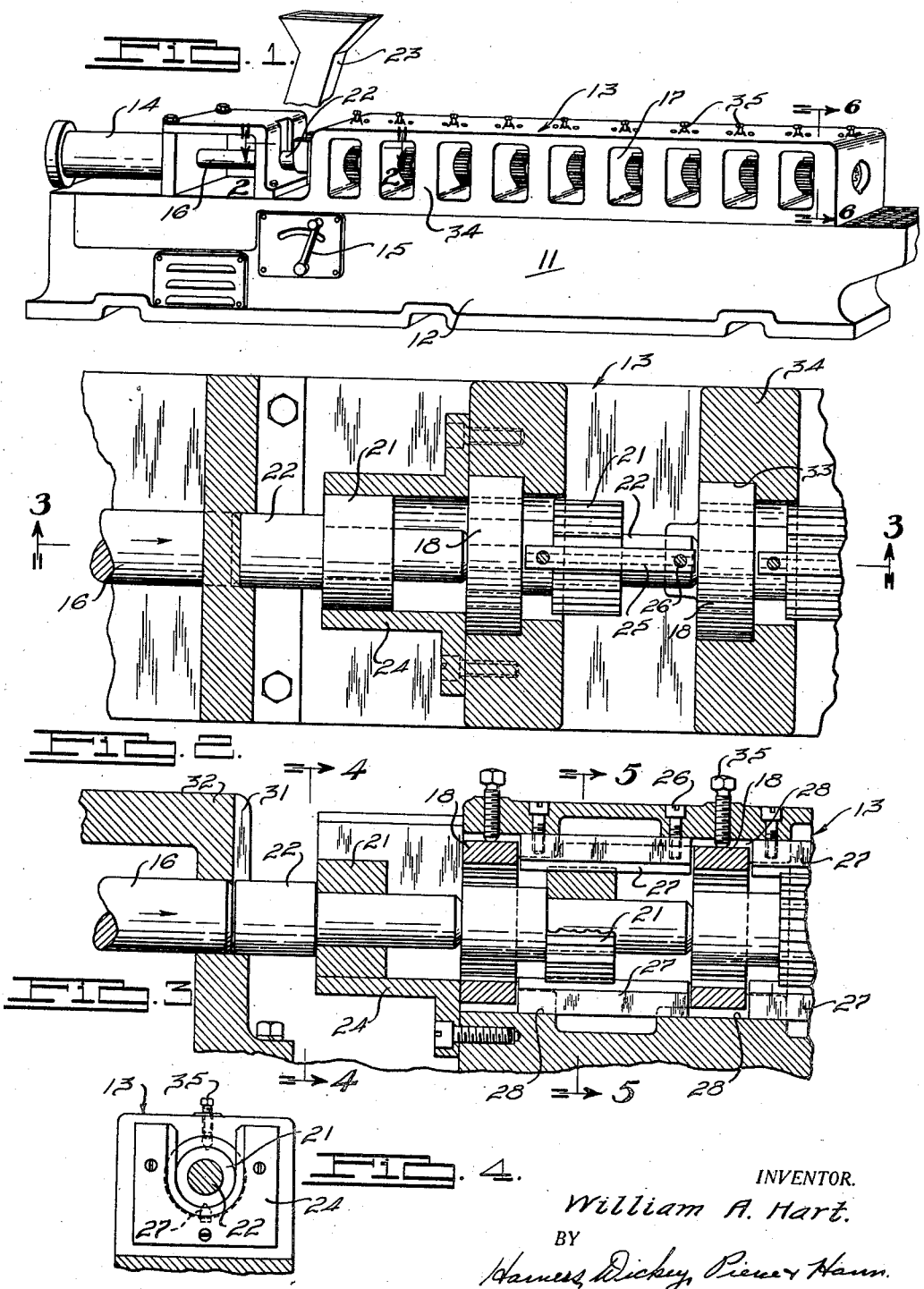
INVENTOR.
William A. Hart.
BY
Harness, Dickey, Pierce & Hann.
ATTORNEYS.

Dec. 14, 1937.  W. A. HART  2,102,071
GEAR BROACHING MACHINE AND METHOD
Filed April 29, 1935  2 Sheets-Sheet 2
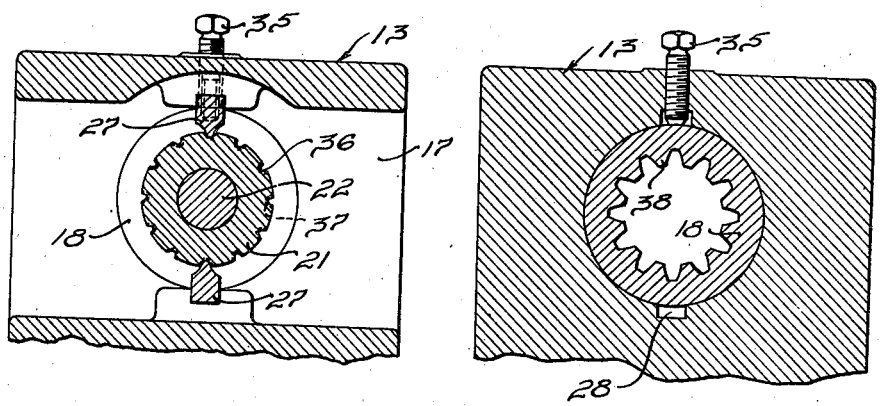
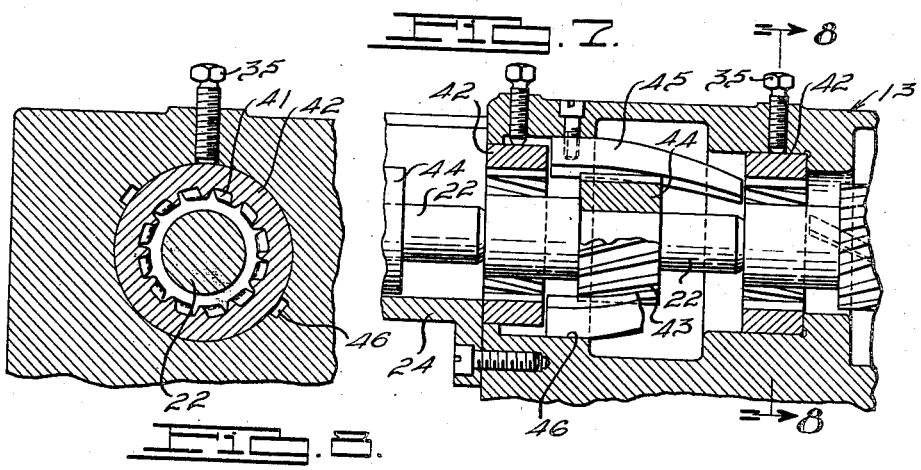
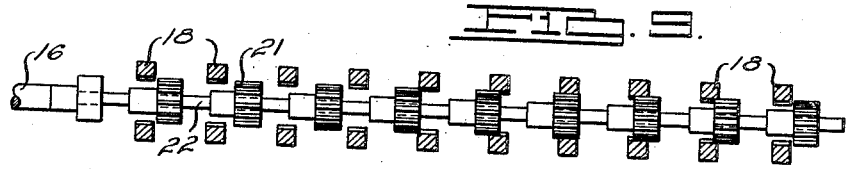
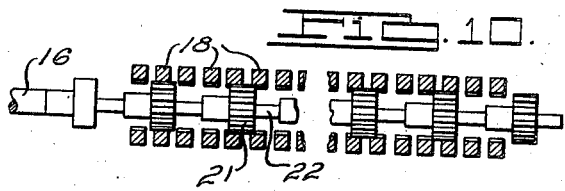
INVENTOR.
William A. Hart.
BY
Harness, Dickey, Pierce & Haun.
ATTORNEYS.

Patented Dec. 14, 1937

2,102,071

UNITED STATES PATENT OFFICE 2,102,071

GEAR BROACHING MACHINE AND METHOD

William A. Hart, Detroit, Mich., assignor to Colonial Broach Company, a corporation of Michigan Application April 29, 1935, Serial No. 18,840

11 Claims. (Cl. 90—8)

My invention relates to methods and machines for broaching gears, and particularly to a method and means for broaching a plurality of teeth of desired form on blanks to produce gears of the spur or spiral type.

Difficulty has been experienced heretofore when attempting to commercially broach gears from a blank because of the plurality of teeth to be formed thereon. A plurality of internal broaching rings has been suggested employed in combination with a ram which forces a gear blank through the entire series of rings in a single operation of the ram. Such construction has never been commercially successful.

In practicing my invention, I employed a plurality of broaching rings having teeth on the inner sides thereof complementary of the teeth which are to be formed on the blank. The teeth of the rings are of increasing depth from the front to the rear rings to progressively cut and enlarge grooves on the blank as it is passed therethrough. A ram is provided which advances the blank only a portion of the way through the series of rings, to progressively operate on an entire series of blanks during each advance of the ram. This eliminates the large ram and plunger and the time required for the plunger to pass through the entire series of broaching rings and return when machining the blanks singly.

Once the machine is loaded, each time the ram advances a new blank within the rings, a finished gear will pass from the end finishing rings of the series. The advancement of the ram only a portion of the distance through the rings effects the machining of a gear because of the plurality of blanks in various machined stages acted upon, to be advanced toward the finishing rings of the series.

The broaching rings may be so disposed to have the various blanks in the machine advanced to a different point relative to the broaching rings, to evenly distribute the load on the ram. That is to say, some of the blanks will be engaging the rings, while others will be passing therefrom to distribute the cutting load and to provide a more balanced condition than that effected when all of the blanks are positioned to be machined at one point in the movement of the ram. This would tend to overload the ram and would require excessive pressures, which are materially reduced when the load is distributed as above pointed out.

Guides may be provided for supporting the blanks and for turning the blanks when spiral gears are broached. The guides are disposed between the broaching rings to retain the blank aligned with the ring teeth and to cause the blanks to follow the desired spiral angle of the teeth to be broached in the blanks. The guides likewise center and support the blanks when passing from one ring to another, when the rings are spaced. It is desirable to space the rings sufficiently to permit the chips to pass therebetween and to permit the proper lubrication of the teeth.

The blanks preferably are disposed on an arbor and dropped into a trough which aligns the arbor with the ram and the arbors on other blanks already advancing into the broaching rings. The loading may be effected manually or automatically by means of a hopper. Automatic mechanism may be provided which effect the advancement and the withdrawal of the ram each time an arbor end blank is automatically disposed in position to be operated upon by the ram. In this manner, extremely rapid broaching operations can be effected on several blanks simultaneously to produce gears having desired teeth formed thereon. The end broaching rings may be provided with finishing teeth to have the teeth of the gear of exact form and size when finally ejected from the machine.

Accordingly, the main objects of my invention are: to provide a machine for accurately broaching gear teeth on blanks through the movement of a ram only a portion of the distance through the machine; to provide the machine with a plurality of broaching rings having teeth of progressive contour to cut the teeth in the blank through a single passage of the blank therethrough; to provide a plurality of broaching rings in aligned relation and advance a plurality of blanks therethrough simultaneously; to provide a broaching machine in which a plurality of blanks having arbors thereon are advanced by a ram each time it is reciprocated the length of an arbor to advance a plurality of arbors and blanks simultaneously through the broaching rings; to provide a ram for advancing the broaching blanks and arbors a short distance through a series of broaching rings to have a finished blank delivered from the machine each time the ram is advanced; to provide a plurality of broaching rings disposed in such spaced relation relative to the degree of advancement of the ram to have the blanks disposed in different relation to the rings at the end of the movement of the ram; to provide guides for the gear blanks which retain them positioned relative to the teeth of the rings; to provide a guide of the spiral type between the broaching rings in continuation of the spiral teeth thereon for positively turning the blanks relative to the rings when spiral gears are to be broached; to machine guide slots in the gear blank when the blank is initially advanced to be thereafter received by the guides; and, in general, to provide a broaching machine for gear blanks which is simple in construction, positive in operation and economical of manufacture.

Other objects and features of novelty of my invention will be specifically pointed out or will become apparent when referring, for a better understanding of my invention, to the following description taken in conjunction with the accompanying drawings, wherein:

Figure 1 is a perspective view of a broaching machine embodying features of my invention;

Fig. 2 is an enlarged sectional view of the structure illustrated in Fig. 1, taken on the line 2—2 thereof;

Fig. 3 is an enlarged sectional view of the structure illustrated in Fig. 1, taken on the line 3—3 thereof;

Fig. 4 is a reduced sectional view of the structure illustrated in Fig. 3 taken on the line 4—4 thereof;

Fig. 5 is a sectional view of the structure illustrated in Fig. 3, taken on the line 5—5 thereof;

Fig. 6 is an enlarged sectional view of the structure illustrated in Fig. 1, taken on the line 6—6 thereof;

Fig. 7 is a view of a structure, similar to that illustrated in Fig. 3, showing a modified form thereof;

Fig. 8 is a sectional view of the structure illustrated in Fig. 7, taken on the line 8—8 thereof;

Fig. 9 is a sectional view of a plurality of broaching rings and gear blanks illustrating one relation thereof, and Fig. 10 is a view of the structure similar to that illustrated in Fig. 9, showing a further relation between the blanks and rings.

In Fig. 1, I have illustrated a machine 11 embodying a base 12. A broaching ring supporting housing 13 and a ram 14 aligned therewith are disposed on the base 12. Suitable driving and controlled mechanism, not shown, is disposed within the base 12 and controlled by the operating handle 15 for providing and regulating a flow of fluid into one or the other end of the ram 14 for advancing and/or retracting its plunger 16. The housing 13 is provided with a plurality of openings 17 in the walls between which broaching rings 18 are disposed. The rings are accessible through the opening which permits the removal of the chips and the lubrication of the broaching rings. The plunger 16 travels only a short portion of the length of the housing 13 and advances a gear blank only a portion of the distance through the broaching rings 18. Thereafter the plunger 16 is retracted, and a new blank inserted in the machine and advanced along with the blanks within the housing 17 previously advanced by the plunger 16. When the housing 17 is filled with the blanks, each movement of the plunger 16 causes a finished gear to be ejected from the end machine. That is to say each movement of a new blank into the housing 17 will cause a finished gear to drop from the opposite end of the housing.

A gear blank 21 is mounted on an arbor 22 having a shoulder which engages and moves the blank when the arbor is advanced by the plunger 16. The blanks and arbors are delivered by a hopper 23 to a yoke 24, which is disposed between the ram 14 and the housing 13, to have the blank 21 and arbor 22 aligned with the plunger 16 and the arbor 22 on the blank which was previously pushed through the first broaching ring 18. As soon as the arbor and blank have dropped into this position the plunger 16 is advanced to push the arbor and blank into the housing 13 to thereby advance the other arbors and blanks previously advanced into the housing 13. Thereafter the plunger 16 is retracted and another blank 21 and arbor 22 are manually or automatically disposed in the yoke 24 to be acted upon by the plunger as it is again advanced.

The advancement of the plunger 16 on the blanks and arbors disposed in the yoke 24 is very rapid and many gears per minute will be delivered from the finishing end of the housing 13, one for each forward advancement of the plunger.

In the first stage when the blank 21 is moved out of the yoke 24 through the first broaching ring 18, a support will be required for centering and positioning the blank when the rings are spaced apart a greater distance than the thickness of the blanks. After the blank passes through the first broaching ring 18, when so spaced, it is supported on guide bars 25, a number of which may be employed about the periphery of the blank. Two bars are illustrated, one at the top and one at the bottom, supported by screws 26, having an edge 27 complementary in shape to the groove cut in the blank by the teeth of the ring, thereby positioning the blank relative to the ring 18 toward which the blank is advanced. Suitable slots 28 are disposed in the housing 13 for receiving the guide bars 25.

Yokes, similar to the yoke 24, could be employed throughout the length of the housing for supporting the blanks, as well as other devices, but the bars 27 are preferably employed to eliminate the possibility of the chips being carried forward into the teeth of the rings toward which the blank is advanced. A slot 31 is provided in the face of the housing 32 of the ram 14 for receiving the rear end of the arbor 22, as illustrated in Fig. 3, to assist the yoke 24 in supporting the arbor and blank. The exact alignment of the arbors and blanks with each other and the plunger 16 will always be assured.

The broaching rings 18 are supported in shouldered recesses 33 in the partitions 34 of the housing 13. The partitions provide the spaces 17 from which the rings and the chips are removed. Suitable set screws 35 are provided for locking the rings 18 in aligned relation against a turning movement. The slots 28 extend throughout the length of the housing, at the top and at the bottom, to receive the blade 27 between the rings 18, as hereinabove set forth.

In Fig. 5, I have illustrated a section through the housing 13, through a portion of a space 17 therein. The gear blank 21 having been pushed through one or more rings 18, has a plurality of notches 36 formed thereon. The blades 25 support the blank 21 by engaging two of the notches 36, as clearly illustrated in the figure. During the next advancement of the blank the notches 36 will be enlarged by the teeth 37 in the next ring 18 which are larger than the notches 36 previously cut in the blank 21, although aligned directly therewith. The next guide bar 26 will have the blade portion 27 enlarged to mate with the larger notch cut in the blank.

In Fig. 6, I have illustrated the last ring 18 having teeth 38 which are complementary of the teeth to be formed in the gear blank. After the blank 21 passes through this last broaching ring 18, the gear will be finished to accurate desired dimensions. Two or more of the finishing rings 18 may be provided when very accurate gears are to be finished by my machine.

In Figs. 8 and 9, I have illustrated a further form of my invention wherein the teeth 41 of the broaching ring 42 are disposed on a desired spiral angle to cut spiral teeth on the blank. As the blank 44 passes through the first spiral broaching ring 42, grooves 43 of spiral shape will be cut therein following the spiral angle of the cutting teeth of the rings 42. Two supporting bars 45 of spiral shape following the spiral lead of the grooves 43 in the blank, are disposed between the rings 42 for guiding, supporting and turning the blanks 44 as they are advanced through the rings. It is to be understood that more of the bars 45 may be employed if it is found desirable or necessary for supporting and turning the blank by the engagement with the spiral slots cut therein. The bars 45 are disposed in spiral grooves 46 provided in the housing 13 the same as the grooves 28 in the structure illustrated in Fig. 1. The progressive movement of the blanks 44 through the rings 42 along the bars 45, will cause the blanks to turn in accordance with the spiral lead of the teeth 41 and the bars, to thereby cut spiral teeth in the blank.

If it is found desirable or necessary to turn the blank 44 when passing through the first ring 42, this may be effected by a slot and tongue connection between the end of the arbor 22 and plunger 16 and by turning of the plunger 16 as it is advanced. This will effect a positive turning of the blank 44 as it leaves the yoke 24 and passes through the first ring 42. Thereafter, the bars 45 will cause the blank to turn in accordance with the spiral angle of the teeth 41 on the broaching rings 42. In this manner, spiral gears may be as readily broached as gears of the spur type, described relative to the structure illustrated in Figs. 1 to 6, inclusive.

In Fig. 9, I have illustrated the plurality of rings 18 or 42, as the case may be, spaced apart an amount different from the length of advancement of the plunger 16. This positions the blanks in different relation to the rings. Some of the blanks will be leaving the rings, others will be passing therethrough, while others will be commencing engagement with the rings. As a result, the load on the plunger 16 and the ram 14 will be uniformly distributed and will not produce a maximum initial load as would occur when all of the blanks are entering the broaching rings at the same time.

In Fig. 10, I have illustrated the broaching rings as being disposed closely adjacent to each other yet spaced far enough apart to permit the lubrication of the teeth and the passing of the chips from between the broaching rings. The blanks are wider than the spacing and will be advanced through several rings during each advancement of the plunger 16 and materially shortens the machine. When the broaching rings are disposed close enough together, the supporting bars 27 may be eliminated and the blanks are entirely supported and guided on the rings. In either case, the results will be the same and a finished gear will pass from the machine each time the plunger 16 is moved only a portion of the distance therethrough. The plunger 16 is preferably operated automatically in conjunction with the hopper 23, to advance and return each time a blank and arbor is loaded in the yoke 24, which occurs automatically as the plunger returns. A large number of gears per minute are accurately machined in this manner.

While I have described and illustrated but two embodiments of my invention, it will be apparent to those skilled in the art that various changes, omissions, additions and substitutions may be made therein without departing from the spirit and scope of my invention, as set forth in the accompanying claims.

I claim as my invention:

1. A device for broaching gears from blanks including, in combination, a plurality of spaced broaching rings disposed in aligned relation, and a ram having a plunger having a stroke shorter than the overall length of said aligned rings for advancing a blank only part way through said plurality of rings at each stroke, the spacing of said rings being different from the length of said stroke of said plunger to vary the position of the various blanks relative to said rings.

2. A device for broaching gears from blanks including, in combination, a plurality of broaching rings disposed in aligned relation, a ram having a plunger having a stroke shorter than the overall length of said aligned rings, and means for actuating said plunger to thereby advance a blank only part way through said plurality of rings and to advance the blanks previously disposed within the rings to have a finished gear moved from the end ring each time the plunger is advanced, said machine being adapted to receive a new blank after each said stroke, and means for turning said blanks during their advance through the rings to follow the spiral lead of the cutting teeth of the ring to produce spiral gears.

3. A device for broaching gears from a blank including, in combination, a plurality of broaching rings disposed in aligned relation, a ram having a plunger for advancing a blank part way through said rings at each stroke of said plunger, an arbor individual to each blank for supporting said blank and disposed between said plunger and said rings, and means for operating said ram to advance the plunger, an arbor and a blank into said rings and further advancing blanks and arbor already disposed therein to have a gear and arbor pass from the end finishing ring each time a new blank and arbor is advanced by the plunger, said plunger having a stroke shorter than the overall length of said broaching rings, so that each gear passes said rings in a plurality of steps.

4. A device for broaching the gears from a blank, including, in combination, a plurality of broaching rings disposed in aligned spaced relation, a ram having a plunger for advancing a blank part way through said rings at each stroke of said plunger, an arbor individual to each blank for supporting said blank between said plunger and said rings, means for operating said ram to advance the plunger, an arbor and a blank into said rings and further advancing blanks and arbor already disposed therein to have a gear and arbors pass from the end finishing ring each time a new blank and arbor is advanced by the plunger, and means for supporting the arbor and gear during their passage from one ring to another.

5. A device for broaching spiral gears from blanks including, in combination, a plurality of rings having spiral teeth extending inwardly thereof and disposed in spiral alignment, a ram having a plunger having a stroke shorter than the overall length of said aligned rings for advancing a blank a portion of the way through the plurality of rings at each stroke thereof, said rings being so disposed as to receive several blanks as they are progressively moved therethrough by the action of the plunger, means for positively turning said blanks as they move through the rings to follow the spiral lead of the cutting teeth, said rings being spaced apart an amount different from said length of stroke of the plunger to have the blanks within the rings disposed in different relation to the rings at the end of each stroke of the plunger.

6. The method of broaching, which is characterized by successively feeding articles to one end of a broach having a toothed portion, applying force between the broach and the last article fed thereto to advance said articles relative to the broach in a succession of steps, an article being fed to said broach after each step, each step advancing the articles relative to the broach a distance less than the overall length of the broach toothed portion.

7. The method of broaching, which is characterized by successively feeding articles to one end of a broach having a toothed portion, applying force between the broach and the last article fed thereto to advance said articles relative to the broach in a succession of steps, an article being fed to said broach after each step, each step advancing the articles a distance less than the overall length of the broach toothed portion, and each article being successively advanced by the pressure of the article behind it.

8. The method of broaching articles, which comprises utilizing a broach having a plurality of groups of teeth of predetermined length disposed in aligned relation, successively feeding articles to the first one of said groups, advancing each article relative to the broach by the pressure of the article behind it, each step advancing each article a distance which is less than the overall length of the broach and is different than said predetermined length, and an article being fed to the broach after each step.

9. A device for broaching articles including a broach having a series of teeth, means for successively feeding articles to said broach so that a plurality of said articles are simultaneously in broaching position, means for effecting successive steps of relative movement between said plurality of said articles and said broach, each step being shorter in length than the length of said broach, and said feed means being adapted to have an article fed to said broach after each said step.

10. A device for broaching articles, including a broach having a series of teeth, means for successively feeding articles to said broach one after each step so that a plurality of said objects are simultaneously in broaching position, means including a plunger for applying force between said plurality of articles and said broach to effect successive steps of relative movement therebetween, said plunger having a working stroke less than the overall length of said broach, so that each of said steps is shorter than the length of said broach, and each article advances the article ahead of it by pressure therebetween.

11. A device for broaching articles, including a stationarily supported broach, having a series of teeth, a plunger movable relatively to said broach, means for successively feeding articles between said plunger and broach one after each step so that a plurality of said articles are simultaneously in broaching position, means for successively operating said plunger to successively advance said articles past said broach in step-by-step manner, the stroke of said plunger being shorter than the length of said broach and each article advancing the article ahead of it by pressure therebetween.

WILLIAM A. HART.